United States Patent [19]

Fabian

[11] 4,092,578
[45] May 30, 1978

[54] ELIMINATION OF VOTER CAUSED DEADZONE

[75] Inventor: Gordon R. Fabian, Cedar Rapids, Iowa

[73] Assignee: Rockwell International Corporation, El Segundo, Calif.

[21] Appl. No.: 747,450

[22] Filed: Dec. 3, 1976

[51] Int. Cl.² .............................. G05B 9/03
[52] U.S. Cl. .................... 318/564; 318/610; 318/621; 307/355; 307/219
[58] Field of Search .................... 318/610, 564, 621; 307/219, 355, 357

[56] References Cited

U.S. PATENT DOCUMENTS

| | | | |
|---|---|---|---|
| 3,596,107 | 7/1971 | Kittrell | 307/219 X |
| 3,610,950 | 10/1971 | Keller et al. | 307/219 X |
| 3,741,474 | 6/1973 | Kawada et al. | 318/610 X |
| 4,001,605 | 1/1977 | Thomas et al. | 307/355 |

Primary Examiner—James R. Scott
Assistant Examiner—John J. Feldhaus
Attorney, Agent, or Firm—Terry M. Blackwood; Robert J. Crawford; L. Lee Humphries

[57] ABSTRACT

A redundant channel control system includes one or more voters having a high-pass filter connected between a pair of voter inputs.

10 Claims, 5 Drawing Figures

PRIOR ART

ELIMINATION OF VOTER CAUSED DEADZONE

This invention relates generally to signal selection and to redundant channel control systems.

Redundant channel control systems are frequently employed in aircraft guidance control systems to prevent disastrous results in the event of electronic equipment malfunction. Signal selectors or "voters" are employed to select which channel, if any, will actually have authority over the flight control surface. The voter has a built-in decision capability which prevents intolerable hardover control situations.

In some systems, one of the voter input signals (i.e., one of the selectable signals) is a constant dc level V, where V may be zero, positive, or negative. Due to difficulties in producing channels which produce exactly identical signals, a control deadzone exists when the channel derived signals approach the level V, and the level V becomes the selected output.

In accordance with the present invention, there is featured the elimination of such deadzone problems. These and other features, objects, and advantages of the invention will become more apparent upon reference to the following specification, claims, and appended drawings in which:

Figure 1:
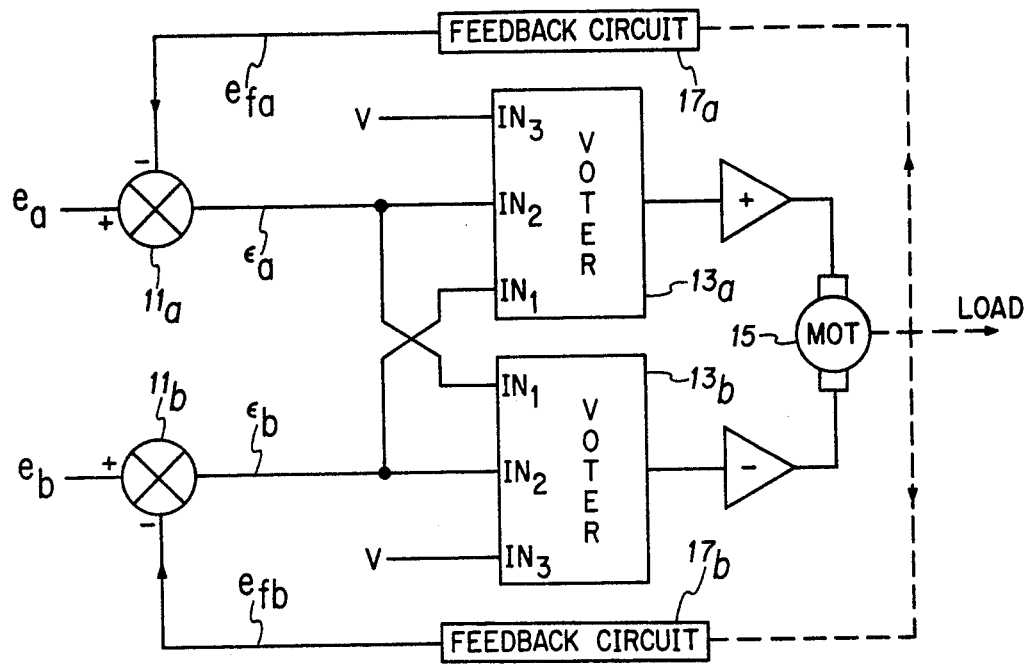
FIG. 1 is a functional circuit diagram representing a typical prior art dual channel servo loop.

FIG. 1 shows a portion of a typical prior art dual channel control system, and more particularly, a typical prior art dual channel servo loop. Signals $e_a$ and $e_b$ are substantially similar signals and in the ideal case, if such were realizable, would be identical. Each of $e_a$ and $e_b$ is a servo command signal and is fed into its channel's summing junction, 11a or 11b. Each summing junction also receives its channel's feedback signal $e_{fa}$ or $e_{fb}$, and produces an error drive signal, $\epsilon_a$ or $\epsilon_b$. The error drive signals $\epsilon_a$ and $\epsilon_b$ are each coupled into its associated channel's voter, 13a or 13b, and are also cross coupled into the other channel's voter. The remaining input of each voter receives a dc reference signal of amplitude V, where V is typically equal to zero. The voters 13a and 13b are each typically mid-algebraic voters, which means the algebraically intermediate input is selected as the output. Stated another way, a mid-algebraic voter prevents the two signals whose amplitudes are at the algebraic extremes (i.e., the algebraically most positive and the algebraically most negative) from being outputted, and outputs a signal corresponding to the third and remaining input signal.

The two voter outputs are amplified, one with a polarity change, to produce a differential excitation across the motor 15. Feedback circuits 17a and 17b each typically produce a type of position feedback and typically comprise a rate generator (e.g. tachometer) followed by integrator or appropriate filter. The dashed lines represent mechanical coupling. It is apparent that such a system is fail-safe because if for instance channel "a" malfunctions and $\epsilon_a$ becomes large (positively or negatively) both voters will select either the zero input or the channel "b" input which is still good. In other words when the system fails so that one channel directs a hardover maneuver, the failure is safe in that either no authority, or accurate authority, is effectuated.

As mentioned hereinabove, problems arise due to the practical impossibility of producing $e_a$ and $e_b$ such that they are identical. For instance, due to such things as imperfectly matched components, dissimilar aging characteristics, imperfect setup, etc., it is fairly common for $e_a$ and $e_b$ to differ by a relatively constant dc potential; i.e., $e_a(t) - e_b(t) \approx \Delta$, where $\Delta$ is a constant. The following example is illustrative of the problems incurred. Assume that initially the servo output position is zero and the $e_{fa}$ and $e_{fb}$ are each substantially zero. Also assume that due to the aforementioned offset, $e_a$ and $e_b$ are respectively +0.1 volts and −0.1 volts. Voter input signals $\epsilon_a$ and $\epsilon_b$ will also be +0.1 volts and −0.1 volts respectively and the voters will both output zero since among the input values +0.1, −0.1, and 0, 0 is the algebraic mid-value. Assume now that the commands change so that both $e_a$ and $e_b$ start to increase to more positive values. However in order for the voters to recognize any change, the commands must increase by more than 0.1 volts. Until said commands increase by more than 0.1 volts both voter outputs remain zero. As $\epsilon_b$ is raised above zero, it becomes the selected signal, and the motor starts responding.

The control deadzone in such an instance thus produces an undesirable response lag. Moreover, the control deadzone produces an undesirable servo position overshoot as the servo position approaches its commanded position. More particularly, as the servo output position approaches the position to which it was directed, $\epsilon_a$ and $\epsilon_b$ decrease in amplitude and approach zero values. As $\epsilon_b$ crosses zero, the zero value input is selected as the output, and authority over servomotor shaft and load is lost until $\epsilon_a$ and/or $\epsilon_b$ change sufficiently to again assert control. With the servomotor thus freewheeling in the control deadzone, momentum produces a position overshoot.

Figure 2:
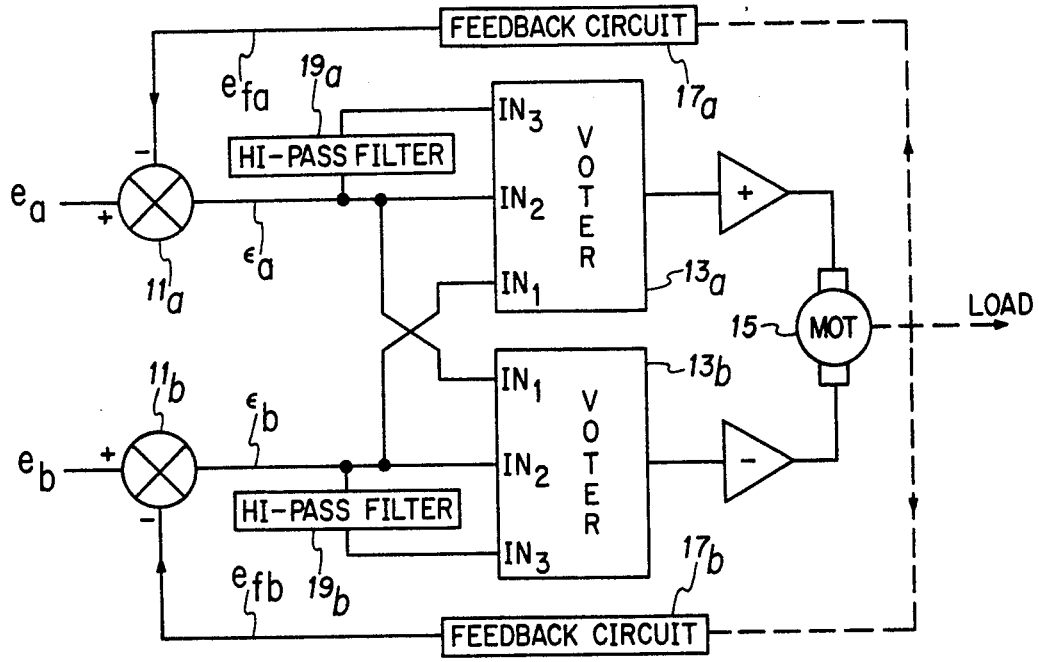
FIG. 2 is a functional circuit diagram representing a preferred embodiment of the present invention.

Turning now to FIG. 2, the inventive embodiment there shown is seen to resemble the FIG. 1 apparatus except that instead of merely providing each voter's third input with a constant amplitude signal, the third input of the "a" channel voter is coupled through a high-pass filter 19a to $\epsilon_a$, and the third input of the "b" channel voter is coupled through a high-pass filter 19b to $\epsilon_b$. More particularly, the FIG. 2 embodiment, like FIG. 1, is a dual channel servo loop including two summing junctions 11a and 11b, two mid-algebraic value voters 13a and 13b, a servomotor 15, and two feedback circuits 17a and 17b. Unlike FIG. 1, the FIG. 2 apparatus includes two similar high-pass filters 19a and 19b, filter 19a being connected between voter 13a input terminals $IN_2$ and $IN_3$, and filter 19b being connected between voter 13b input terminals $IN_2$ and $IN_3$. The presently preferred filter embodiment is shown in FIG. 3 and comprises a series connected resistor-capacitor network.

In operation, each filter operates somewhat like a differentiator. When $\epsilon_a$ and $\epsilon_b$ are constant, each voter's third input is zero in amplitude. Changes in $\epsilon_a$ and $\epsilon_b$ however are reflected into each voter's third input via filters 19a and 19b, and thus for periods when $\epsilon_a$ and $\epsilon_b$ are changing, each voter's third input is non-zero. The response lag problem hereinabove described for the FIG. 1 apparatus is eliminated because upon a command change, each of the three inputs of each voter immediately receive a signal indicative of said change. Moreover, the position overshoot problem hereinabove described for the FIG. 1 apparatus is eliminated because as $\epsilon_b$ decreases and crosses zero each voter's third input is even more negative (temporarily) than $\epsilon_b$, and thus the voter is allowed to vote $\epsilon_b$ just long enough to stop the motor.

For aircraft control systems the values for the high-pass filter resistor and capacitor are preferably chosen as follows. The FAA establishes limits on craft reaction to hardover-directing commands and thus for a particular craft, reaction limits on flight control surfaces can be determined, usually experimentally. The resistor and capacitor values are thus preferably chosen to provide an RC time constant which, when $e_a$ and/or $e_b$ are excessive step function inputs, permits the high-pass filtered voter input signal to recover substantially back to zero no later than the time the load or control surface arrives at the aforementioned reaction limit. With R and C so chosen, the FAA permissible craft response limits are maintained. Moreover, an RC time constant which is too short, may sometimes cause the voter third input to return to zero too quickly; i.e., before the appropriate one of $\epsilon_a$ or $\epsilon_b$ has a chance to completely stop the servomotor. Thus it is preferable to choose the RC time constant such that $RC_{min}$ is long enough to stop the motor and $RC_{max}$ is short enough to wash out the voter third input before servo output position arrives at the permissible reaction limit.

Figure 3:
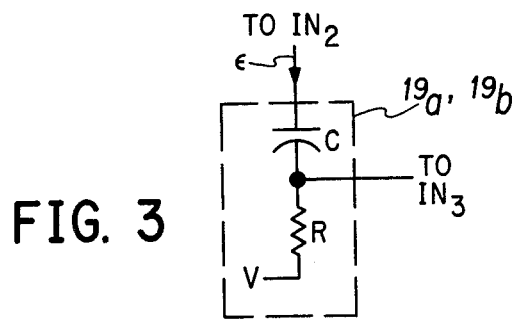
FIGS. 3, 4, and 5 are more detailed diagrams of, respectively, Items 19, 13, and 17 of the FIG. 2 apparatus.

In the present embodiment, which is employed to control the cyclic stick and swash plate in a Bell 206 helicopter, R and C in FIG. 3 are $20k\Omega$ and 0.47uf respectively. Of course, values for R and C should generally be determined for the particular application and embodiment, and for flight control applications should generally be determined and/or verified from flight tests.

Figure 4:
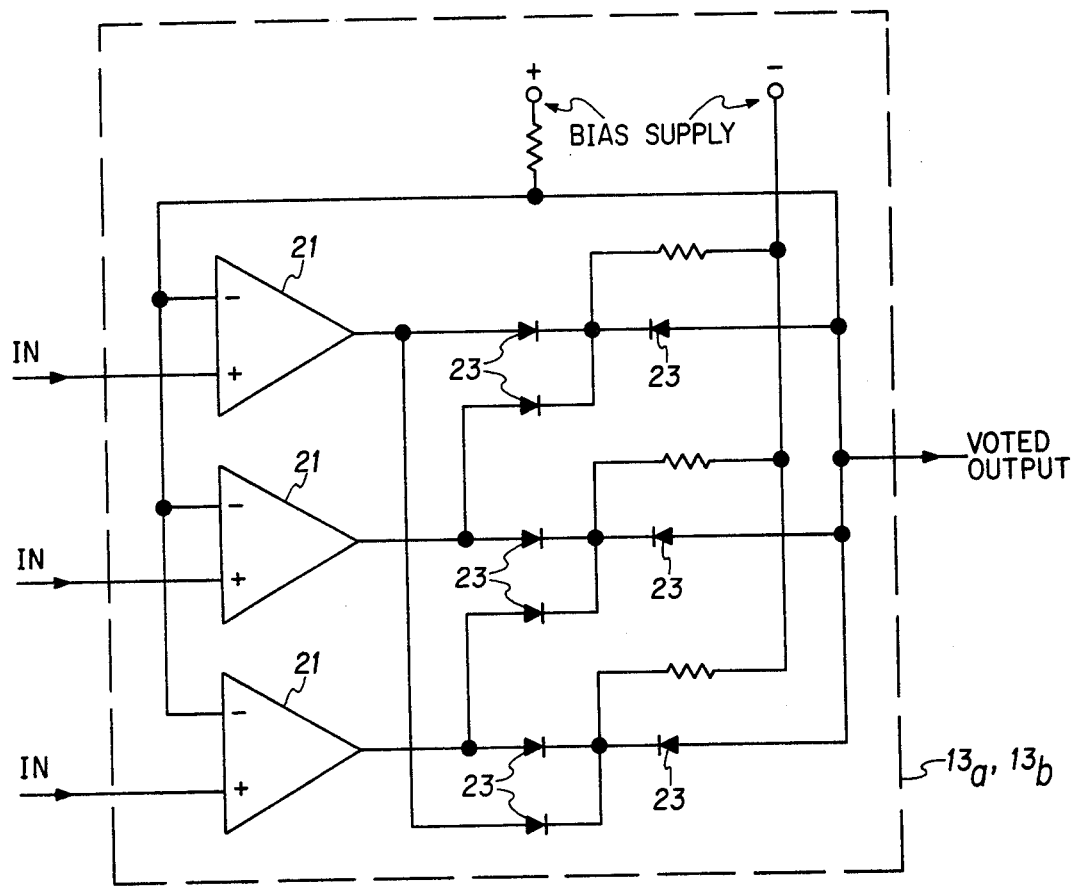

FIG. 4 shows the presently preferred voter embodiment. Items 21 are differential input operational amplifiers and items 23 are diodes. As will be apparent to those skilled in the art, when a single polarity bias supply is employed, each input IN should also be appropriately biased. Moreover, it should be apparent that all three voter inputs are interchangeable and/or that any one input lead would be called $IN_1$, $IN_2$, or $IN_3$. The voter input lead labeling for FIGS. 1, 2, and 3 was arbitrarily chosen and employed for descriptive purposes only, and does not imply any distinction which need be made in practice nor any particular association between input leads and input signals. Voter circuits generally of the FIG. 4 type are well known and understood by those skilled in the art, and thus no further elaboration is required. See U.S. Pat. No. 3,596,107.

Figure 5:
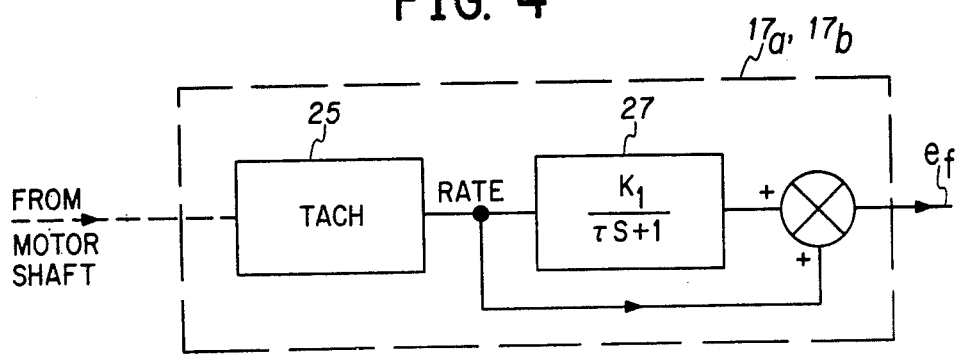

Both of the presently preferred feedback circuits 17a and 17b (shown in FIG. 5) include a tachometer generator 25 and a filter 27. Ignoring the rate signal contribution to $e_f$, which merely provides rate damping in accordance with sound engineering principles, the overall transfer function of the FIG. 5 circuit may be approximated by $K_1K_2S/(\tau s+1)$ where $K_2S$ is the transfer function of the tachometer. The FIG. 5 circuit is of a type well known in the art and generates what is generally termed a washed-out position signal.

It should here be noted that alternative embodiments also possess at least some of the advantages of the FIG. 2 embodiment. For instance, the aforementioned deadzone problem would also be eliminated or reduced by an embodiment similar to the FIG. 2 apparatus except having only one high-pass filter, the other voter being connected as in FIG. 1. Of course motor drive excitation provided during the prior art deadzone periods would be less than that produced by the FIG. 2 embodiment. Also, depending on the fail-safe design objective, the input side of each filter in the FIG. 2 embodiment could be connected to the same channel. Also, more than two channels may be employed, and of course other high-pass filter embodiments or configurations may be used. Thus while various embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. A dual channel closed loop servo system comprising:
servomotor means, and
two servomotor means drive circuits each comprising (a) signal comparison means for receiving both an input command signal and a feedback signal indicative of said servomotor means output position, and for producing a corrective error signal for inducing servomotor means response, (b) feedback means for producing said feedback signal, (c) mid-algebraic value voter means having three input means, the first input means connected to receive the error signal of one drive circuit, the second input means connected to receive the error signal of the other drive circuit, and (d) high-pass filter means connected between the third input means of said voter means and one of the other two input means of said voter means.

2. Apparatus as defined in claim 1 wherein each said high-pass filter means is connected at its associated voter means input side so as to receive a different one of the two error signals.

3. Apparatus as defined in claim 1 wherein each said high-pass filter means comprises resistor means and capacitor means connected in series.

4. In a redundant channel control system having N channels for producing N substantially similar where $N \geq 2$, and signal selector means having $(N+1)$ input means connected for receiving said N channels plus an $(N+1)$th input signal, said signal selector means providing an output corresponding to the input whose amplitude ranks J th among the amplitude ordered arrangement from most positive through most negative of the $(N+1)$ input amplitudes, J being one of the group of numbers 1 through $(N+1)$, the improvement comprising high-pass filter means connected between (a) any one of the input means connected for receiving one of the N channels and (b) the input means connected for receiving said $(N+1)$th input signal.

5. Apparatus as defined in claim 4 wherein $N=2$, and $J=2$, such that said signal selector means has three inputs and provides an output corresponding to the input having the mid-algebraic value.

6. In a redundant channel control system having N channels for producing N substantially similar signals where $N \geq 2$, and N signal selector means each having $(N+1)$ input means connected for receiving said N channels plus an $(N+1)$th input signal, each said signal selector means providing an output corresponding to the input whose amplitude ranks J th among the amplitude ordered arrangement from most positive through most negative of the $(N+1)$ input amplitudes, J being one of the group of numbers 1 through $(N+1)$, the improvement comprising N high-pass filter means each connected at the input side of a different one of said N signal selector means so as to be between the associated selector means's (N+1)th signal input means and any one of the N remaining input means.

7. Apparatus as defined in claim 6 wherein each said high-pass filter means is connected at its associated selector means input side so as to receive a different one of said N substantially similar signals.

8. The system comprising:
(a) signal selector means (i) having a predetermined plural number M of input means, (M−1) of which are connected for receiving one each of (M−1) input signals, and (ii) providing an output corresponding to the input whose amplitude ranks J th among the amplitude ordered arrangement from most positive through most negative of the M input amplitudes, and
(b) high-pass filter means connected between (i) any one of the (M−1) input means connected for receiving one of the (M−1) input signals and (ii) the M th input means.

9. Apparatus as defined in claim 8 wherein $M \geq 3$.

10. Apparatus as defined in claim 9 wherein $M=3$ and $J=2$.

* * * * *